July 22, 1952 — F. W. JARDON ET AL — 2,603,791
ARTIFICIAL EYE
Filed Feb. 9, 1944 — 2 SHEETS—SHEET 1
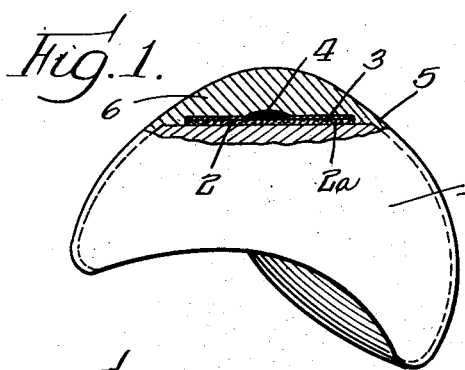
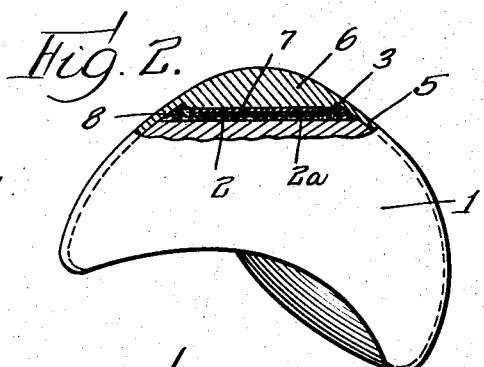
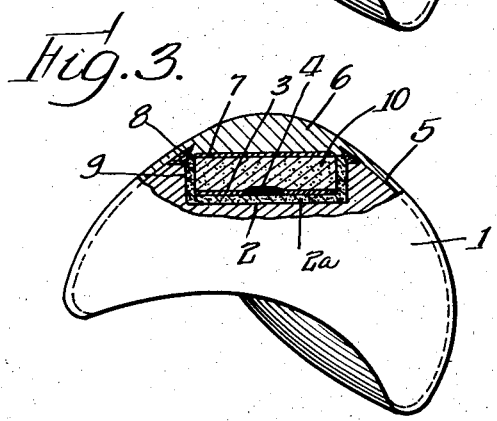
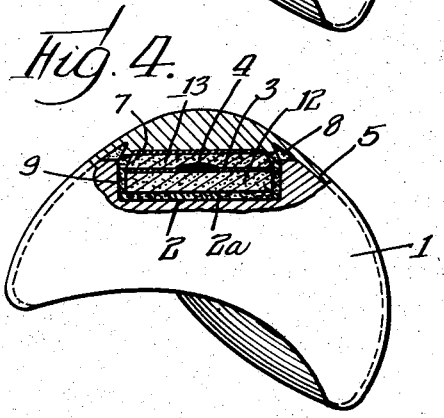
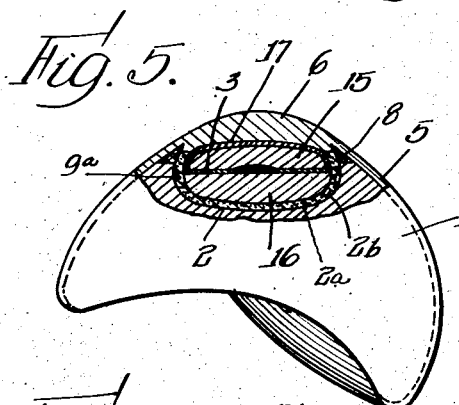
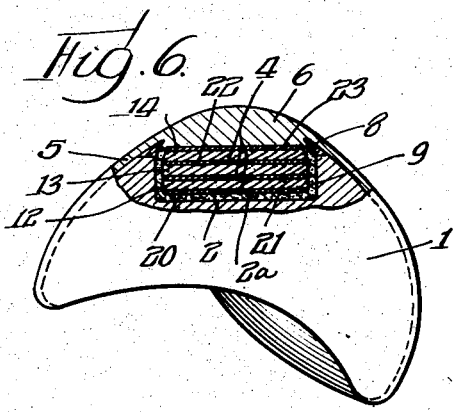
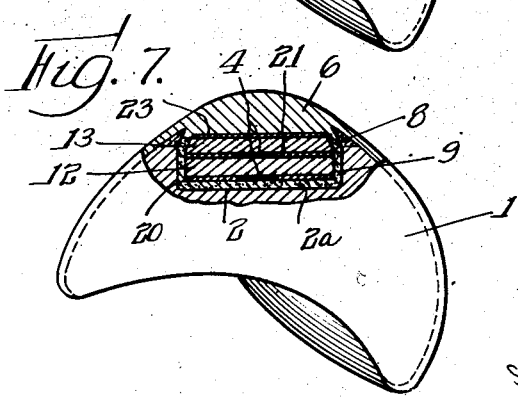
INVENTORS.
Fritz W. Jardon
Reuel W. Bennett

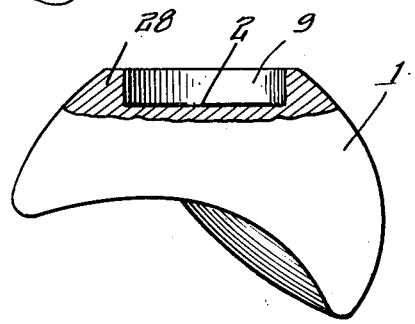
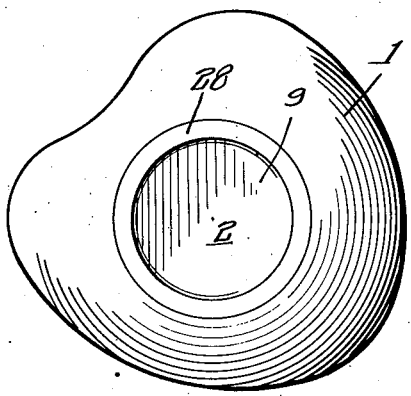
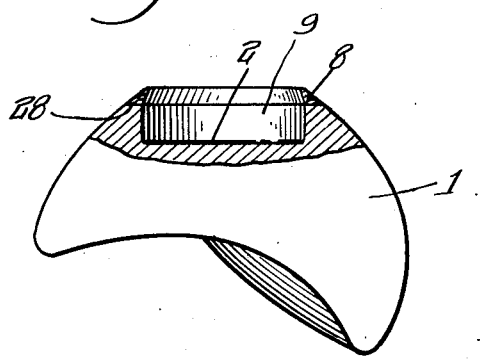
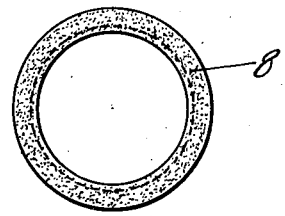
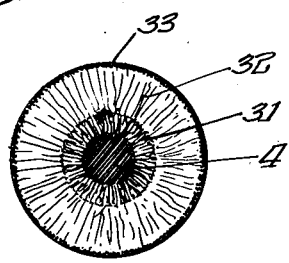
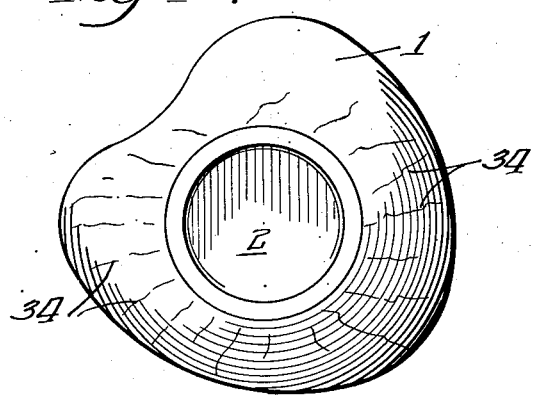

Patented July 22, 1952

2,603,791

UNITED STATES PATENT OFFICE 2,603,791

ARTIFICIAL EYE

Fritz W. Jardon, Evanston, Ill., and Reuel W. Bennett, Michigan City, Ind., assignors to American Optical Company, Southbridge, Mass., a voluntary association of Massachusetts Application February 9, 1944, Serial No. 521,646

15 Claims. (Cl. 3—13)

1

This invention relates to the art of manufacturing artificial eyes, and it is particularly directed to improvements in artificial eyes constructed of plastic material as distinguished from glass and similar frangible materials which have previously been used for this purpose.

One object of the invention is to provide a new and improved artificial eye composed of plastic, together with novel and practicable methods of constructing the same.

Another object of the invention is to provide an artificial eye in which the appearance of a natural eye is faithfully reproduced and which is adapted to retain such appearance permanently.

A further object of the invention is to provide a method of constructing an artificial eye which permits of making the basic structure in quantities and assembling chosen elements to produce the desired tint or color for matching the natural eye of the patient.

It is also an object of the invention to provide an artificial eye constructed of plastic material adapted to withstand rough usage or accident without breaking, and of a composition which will be unaffected by contact with the body tissues and will be neutral with respect thereto so as to cause no discomfort to the wearer.

More specifically, this invention undertakes to provide a type of construction for an artificial eye in which the iris portion may be composed of one or more colored photographic reproductions of a natural iris or of one or more colored units of pigment, arranged to provide the natural fibrous appearance, with such units superimposed in the relation of positive to positive, negative to negative or positive to negative in an assembly to produce an appearance of depth, and also to secure the desired color tone, such units being sealed in the body of the artificial eye by means of a transparent corneal section of plastic material.

Other objects and advantages of the invention will appear from the following description taken in connection with the drawings in which:

Fig. 1 is a side elevation partly in section, showing one form of artificial eye embodying this invention in which a single colored disk, which may consist of plastic fibres, such as nylon, rayon, or a shredded plastic, or a plastic transparent or semi-transparent plate colored, engraved or etched, is provided to represent the iris.

Fig. 2 is a similar view, partly in section, showing a structure in which the iris color pigment is supplemented with a diffusion or refracting plates and a peripheral blending ring to produce a more natural appearance.

Fig. 3 is also a side elevation, partly in section, showing an artificial eye in which a relatively thick diffusion or refracting plate is disposed directly over the color pigment layer representing the iris, with a diffusion screen superimposed upon said plate to control unwanted reflection from the surface of the pigment layer and give the desired optical effect.

Fig. 4 illustrates a further modification showing an artificial eye partly in section, with anterior and posterior base plates between which the iris pigment layer is disposed, together with a refracting screen at the outer surface of the anterior base plate with color pigment lightly distributed in the base plate.

Fig. 5 is also a side elevation, partly in section, showing an artificial eye with a modified form of recess in the scleral body and a modified disk or button containing the representation of the iris inserted therein.

Fig. 6 is a side elevation, partly in section, showing a plastic eye comprising the combination of three thin photographic or plastic color plates to represent the iris, with diffusion or refracting layers spacing them apart and with a refracting screen forming the outer layer of the assembly.

Fig. 7 is an elevation, partly in section, showing a structure similar to that of Fig. 6 but with a smaller number of pigment or photographic elements composing the iris.

Fig. 8 is a side elevation of the scleral body for an artificial eye, partly in section, showing one form of recess ready to receive the iris and color pigment section, and having a flat annular surface to receive a blending or color graduation wedge or prism-like ring.

Fig. 9 is a plan view of the structure shown in Fig. 8.

Fig. 10 is a sectional view similar to Fig. 8, showing the blending ring in position.

Fig. 11 is a plan view of the blending ring alone.

Fig. 12 is a plan view of an iris disk ready for placement in an artificial eye.

Fig. 13 is a plan view of an artificial eye as shown in Figs. 1 to 6, including the representation of veining thereon.

While we have shown in the drawings and shall herein describe in detail certain preferred forms of our invention, it is to be understood that we do not intend to limit the invention to the specific forms disclosed, but aim to cover all modifications and alternative constructions fall- Various attempts have been made to construct artificial eyes partly or wholly of plastic material, but in some cases it has proved that the plastic employed was detrimental to the tissues of the eye socket when placed in contact therewith, and in other cases the attempt to seal into a plastic body an iris or other elements composed of glass has produced disappointing results. Our invention provides an artificial eye structure in which substantially all parts are composed of similar or closely related plastic materials so that they blend into a monoplastic unit when finally assembled. The plastic we have chosen has been found, by experiment, to be neutral in contact with human tissues so that there is no irritation or inflammation set up by an artificial eye formed of this material. In addition, we have devised novel methods of providing an artificial iris having an entirely natural appearance, and so constructed that an artificial eye can be matched with the remaining natural eye of the patient so perfectly as to color and other peculiarities of appearance as to challenge detection.

As shown in the drawings, the body or scleral portion 1 of the artificial eye is constructed in the usual form which may vary somewhat in size and shape, and is provided with a substantially circular, flat table area 2 which, in most cases, is the bottom wall of a recess formed in the outer or forward portion of the body 1 to receive the iris. We have found that a very realistic iris may be produced photographically or may be constructed manually by arranging or "weaving" fine fibres of colored plastic material into a circular design somewhat resembling that shown in Fig. 12, preferably arranging these fibres on a thin disk of plastic material serving as a temporary support, although with the body form shown in Fig. 1 such an iris might be arranged as shown at 3, directly on the flat surface 2. The small fibres for this purpose may be secured as shavings cut from disks of colored plastic rotated under a phonograph needle or like cutting tool or shredder, and it is found that such fibres readily adhere to a plastic surface as they are arranged by the artist in designing the representation of the iris; or this may also be produced by lithography or etching. However, we prefer to coat the surface 2 with a thin film 2ª of partially polymerized plastic, similar in composition to the body 1, to serve as an adhesive to hold the iris in position. Substantially centrally within the iris disk 3 there is placed a small body 4 of black or dark brown plastic to represent the pupil of the eye. The pupil member 4 and the iris disk 3 may be cemented to the flat table surface 2 by means of a thin film of plastic 2ª of substantially the same composition as the body 1, and the entire assembly is then coated with an outer layer of transparent plastic 5 which is materially thickened at 6, over the iris 3 and pupil 4, in a form corresponding to the cornea and aqueous of the anterior chamber of the natural eye. This construction provides a substantially monoplastic unit, since all of the parts are of similar composition and are welded together in a manner well understood by those skilled in the art of dealing with plastic materials and involving the use of moderate temperatures approximating 200° F.

However, with the relatively simple assembly shown in Fig. 1 there is a tendency for the iris disk to reflect light directly so as to cause a glint or glare from some portions of its area, and to prevent this result we prefer to employ an arrangement such as that shown in Fig. 2, in which the iris disk 3 is overlaid with a thin disk or screen 7 of plastic material which acts to diffuse and refract the light reflected from the iris pigment layer 3 so as to overcome the glare which would otherwise be present. In addition, to enhance the natural effect we add a blending or color gradation ring 8 of wedge-shaped plastic acting as a prism and said ring is disposed peripherally and forward of the iris layer 3 and its reflecting screen 7. This ring may consist of a tinted plastic to resemble the usual marginal portion of a natural iris, which has a color gradation blending the principal darker area of the iris with the lighter scleral portion. A graduated color effect is secured by making the blending ring 8 of graduated or wedge-shaped cross-section, tapering to a sharp inner apex edge and with its outer and thicker base portion lodged upon the supporting surface 2 of the body 1. This assembly is enclosed in a transparent sheath 5 of plastic material covering the scleral area and including a corneal layer 6 covering the iris and the blending ring 8.

Fig. 3 shows a modified structure in which the body 1 is formed with a substantial recess or depression 9 in which the surface 2 is the bottom surface of the recess and in which recess there is disposed a pigment layer 3 representing the iris, with a relatively thick diffusing and refracting plate 10 of transparent plastic material covering the iris disk. This plate 10 may be tinted with pigment, as suggested by the stippling in Fig. 3, and there is also shown a diffusion screen 7, also of plastic material, disposed over the outer face of the plate 10. The refracting plate 10 tends to break up direct reflection from the pigment layer 3, and the diffused rays are further controlled by the screening disk 7. The blending ring 8 is similar to that already described, and the entire assembly is enclosed in a transparent plastic coating 5 with a thickened corneal portion 6. The reflection from the color pigment layer 3 may also be stopped, to some extent, by the use of a partly polymerized monomer, and the presence of the blending ring 8 in this arrangement gives a gradual fading of the scleral color onto and over the peripheral portion of the iris 3.

In Fig. 4 we have shown a further modification which has certain advantages and in which the iris pigment layer 3 is positioned between a posterior base plate or disk 12 of plastic material and an anterior base plate 13, also of plastic material. The anterior surface of the plate 13 holds a thin refracting screen 7 of plastic material, and all these elements, except the pigment layer, may be substantially transparent. However, in some cases, it is found desirable to distribute a limited quantity of color pigment in the base plates 12 and 13 as represented by the stippling in the drawing herewith, thus adding color tints which will affect the appearance of the iris, and may be utilized to modify a standard iris disk for matching a natural eye of slightly different color tone. The base plates and the screen 7 also serve to refract and diffuse the light reflected from the iris disk so as to avoid glare which would produce an unnatural appearance.

In most of the structures shown herein the recess in the scleral body 1 is shown as cylindrical with relatively square corners, but, as indicated in Fig. 5, this recess may be made with rounded contours, and the assembly of iris disk 3, refracting plates 15 and 16 and with a diffusion disk 17, may all be made into a compact button form, with rounded edges, and fitted into the recess 9a. It may be understood that in this and similar structures a cementing coat of transparent or semi-transparent plastic may be applied, as at 2a, between the iris button and the walls of the recess in the scleral body 1, this cementing material being of the same composition as the body 1, preferably of the same white tone.

In the natural eye the iris is composed of interwoven fibres which produce an appearance of depth and of color, and upon dissection it is found that these fibres are disposed in many layers, with those of the predominating color at the outwardly exposed side of the iris determining whether the color is blue or brown or some other shade produced by a blending of these colors. Therefore, to secure the most natural effect we have found that a plurality of pigment layers may be superimposed, as shown in Fig. 6. These layers may be photographic images of a natural iris in different colors, or they may be woven of plastic fibres, as already described. One or more photographic positives with predominating color may be superimposed over a negative with basic color. Rearranging of these negative and positive plates produces many especially desired results. In the arrangement shown in Fig. 7 the innermost or negative layer 20 is sometimes called the foundation color, the next or positive layer 21 is considered as the iris proper, and may contain a mixture of colors to give the appearance of texture and body to the iris. Layers 20, 21 and 22 may also be composed of the primary colors the superimposing of which gives the desired final color impression. We have superimposed more than three images but found that from two to three superimpositions give excellent final results. In Fig. 6 the layer 22 may be understood to include the representation of the sphincter muscle surrounding the pupillary area and the element 23 is a plastic diffusing screen. These several layers may or may not be separated by diffusing plates as shown at 12, 13 and 14, which may be of transparent or semi-transparent plastic and serve to refract reflected rays sufficiently to avoid glint or glare from any of the pigment layers. The several pigment layers may be rearranged as to placement to obtain various natural effects, because in some natural eyes the sphincter area is more forward and in other natural eyes it is depressed, or, if desired, they may be blended together as one layer. They may also be made of nylon or plastic fibres or other pulverized plastic fibers woven to produce the appearance of the iris. It may be understood that each pigment layer may or may not have a central black or dark brown area 4 representing the pupil, or that it may be centrally depressed or raised so that a dark plastic pupil element 4, such as that shown in Fig. 1 or in Fig. 3, may be mounted on the bottom wall 2, of the recess 9 in the scleral body 1 so as to be visible from the front of the eye. The assembly shown in Fig. 6 includes a blending ring 8 similar to that already described, and the assembly constituting the iris button is finally sealed in position at 19 by means of a transparent or semi-transparent plastic and a scleral coating 5 with a corneal portion 6 of transparent or partially transparent plastic depending upon the transparency of the corneal and scleral and limbal regions of the natural eye.

Fig. 8 represents a scleral body 1 of the type suitable for producing the artificial eyes shown in Figs. 3, 4, 6 and 7. This body has a cylindrical recess with a bottom wall 2 and with a peripherally disposed annular surface 28 on which the blending ring 8 may be mounted, as already mentioned. This structure is shown in plan view in Fig. 9, and Fig. 11 shows the blending ring itself in plan. When this ring is mounted in position on the annular ledge 28 its cross-sectional appearance will be such as indicated in Fig. 10.

Fig. 12 is a plan view which may represent any of the iris disks adapted for use in accordance with this invention, whether formed of woven plastic fibres or pigment or produced by a photographic process or lithography as a black and white or colored film or layer of fixed pigment or photographic emulsion. The disk includes the central pupillary area 4 surmounted by an annular portion 31 corresponding to the sphincter muscle region, with a wider annular area 32 directly beyond it and constituting the region which gives the eye its recognized color. Fig. 12 also shows a marginal or peripheral area 33 which indicates the contrasting rim of the iris which would show in a photographic film. In any case this appearance is afforded by the presence of the overlapping blending ring 8, causing this portion of the iris to appear lighter or darker than the area 32, it being understood that area 32 or the area 33 may be the lighter or the darker as the case may be, and that the contrasting periphery blends or fades into the adjacent white portion of the eyeball, this blending being accomplished by the graduated prism-like cross-section of the ring 8, as seen in Fig. 10, and as already explained in connection with Fig. 2.

The main body or scleral portion of the artificial eye is made of a white or tinted plastic material of any desired shape and size and appears somewhat as shown in Fig. 9, before the iris has been inserted and sealed in position with the outer plastic coating 5 and corneal portion 6. Within the recess 9, the iris elements as shown in Fig. 3, Fig. 4, Fig. 5, Fig. 6 and Fig. 7 and represented by Fig. 12 are placed. The blending ring 8 is placed on the table surface 28.

Fine lines 34 as shown in Fig. 13, are drawn or etched by a qualified artist on the scleral surface to represent the veins of the eyeball. These lines may be cut or engraved on the surface by means of a sharp, pointed tool, and colored by means of inorganic pigments, India ink, or by threads or other foreign substances of a soluble nature implanted in the grooves or on the scleral body. This coloring material will, of course, be sealed in position upon application of the outer transparent coating 5, which is closely similar to the plastic material of which the main body is composed.

After extensive experiment we have found that a satisfactory plastic material for the manufacture of artificial eyes is composed principally of methyl methacrylate. For cementing purposes, in uniting the several elements of the eyes as above described, we prefer a partially polymerized methyl methacrylate. This may be either a solution of the polymerized solid methyl methacrylate in monomeric (liquid) methyl methacrylate or in dimeric, trimeric or liquid polymeric methyl methacrylate, or a mixture of the above named liquids, or a liquid consisting of monomeric methyl methacrylate which has been partially polymerized. This material may contain an inhibitor or a plasticizer, or both, but should not contain any solvent other than methyl methacrylate or its liquid polymers. As an alternative we may employ ethyl methacrylate in its monomeric and various polymeric forms. After assembly of the several parts the curing of the plastic constituents is completed by subjection to heat, which results in a truly monoplastic structure having great strength and durability, which may be given a high polish, and which may be worn without discomfort or injurious effect upon the contacting tissues.

Reference is herewith made to copending application Serial Number 128,106 filed November 18, 1949, and now abandoned by Fritz W. Jardon, sole, which is a division of the instant application.

We claim as our invention:

1. In an artificial eye, an iris comprising a plurality of superimposed, differently colored positive and negative photographic images of a human eye.

2. In an artificial eye as defined in claim 1, said images being spaced apart in parallel planes with transparent plastic material between them.

3. In an artificial eye as defined in claim 1, said images being spaced apart in parallel planes with transparent plastic material between them and with an outer layer of transparent plastic material serving as a diffusion screen.

4. An artificial iris composed of positive and negative photographic images arranged in superimposed and spaced relation to each other.

5. An artificial iris composed of positive and negative photographic images arranged in superimposed and spaced relation to each other with at least one of said photographic images embodying pigmentation.

6. An artificial eye comprising a scleral body of plastic material having a recess therein, an iris portion disposed in said recess, said scleral body, adjacent the recess, supporting a portion tapering inwardly to a relatively sharp edge and defining an aperture of a diameter less than the diameter of the iris portion disposed in the recess and a layer of transparent plastic material overlying said iris portion, said tapered portion and an adjacent portion of the scleral body.

7. An artificial eye comprising a scleral body of plastic material having a recess therein, a disc-like iris portion disposed in said recess, a portion constituting a part of the wall of the recess surrounding the iris portion and tapering in an inward direction to an annular edge defining an aperture of a diameter less than the diameter of the iris portion disposed in the recess and a layer of transparent plastic material overlying said iris portion and an adjacent portion of the scleral body.

8. An artificial eye comprising a scleral body of translucent plastic material having a recess therein, an iris portion disposed in said recess, said artificial eye having a portion adjacent the periphery of the recess formed with an outer surface substantially flush with the adjacent outer surface of the scleral body and having an inner surface disposed at an angle to its outer surface so as to produce a portion tapering in a direction inwardly to a relatively sharp apex edge substantially annular in shape and being of a diameter less than the diameter of the iris portion disposed in the recess and a layer of transparent plastic material overlying said iris portion, said portion having a relatively sharp inner apex edge and an adjacent portion of the scleral body.

9. An artificial eye of the character described comprising a scleral body having an iris incorporated therein, a tinted blending ring overlapping the periphery of said iris, and a corneal portion enclosing said blending ring and iris, said corneal portion being formed of transparent material and bonded with said scleral body.

10. An artificial eye of the character described comprising a scleral body of plastic material having an approximately circular recess with an iris disposed therein, a flat annular surface surrounding said recess and a tinted blending ring of plastic material seated on said annular surface, said ring being of approximately triangular cross-section tapering to a thin inner edge which overlaps the periphery of said iris and a thin outer edge substantially merging with the surface of the scleral body and a corneal portion enclosing said blending ring and iris, said corneal portion being formed of transparent plastic material and bonded to said scleral body.

11. An artificial eye of the character described comprising a scleral body of plastic material having an iris incorporated therein, a tinted blending ring of said plastic material seated on the scleral body and overlapping the periphery of said iris, and a corneal portion enclosing said blending ring and iris, said corneal portion being formed of transparent plastic material and bonded with said scleral body.

12. An artificial eye of the character described comprising a scleral body of translucent plastic material having a recess in the forward side thereof, an iris button seated in said recess embodying an iris representation and a supporting plate of plastic material, a tinted blending ring of wedge-shaped plastic material overlapping the periphery of said iris button, and a corneal portion of transparent plastic material shaped as a continuous sheath to enclose said iris button and blending ring and extending over the adjacent outer surface of the scleral body surrounding said recess in bonded relation therewith.

13. An artificial eye of the character described comprising a scleral body of translucent plastic material having a recess in the forward side thereof, an iris button seated in said recess embodying a plastic support containing a photographic image of a natural iris, a tinted blending ring of plastic material overlapping the periphery of said iris button, and a corneal portion of transparent plastic material shaped as a continuous sheath to enclose said iris button and blending ring and extending over the adjacent outer surface of the scleral body surrounding said recess in bonded relation therewith.

14. An artificial eye of the character described comprising a scleral body of translucent plastic material having a recess in the forward side thereof, a tinted plastic plate-like member seated in said recess and having an iris representation on the underside thereof, a tinted blending ring of plastic material overlapping the periphery of said plate-like member, and a corneal portion of transparent plastic material shaped as a continuous sheath to enclose said tinted plate-like member and blending ring and extending over the adjacent outer surface of the scleral body surrounding said recess in bonded relation therewith.

15. An artificial eye of the character described comprising a scleral body of thermoplastic resinous material having an iris incorporated therein composed of suitably colored fibres of the same resinous material woven to simulate a natural iris, a tinted blending ring overlapping the periphery of said iris, and a corneal portion enclosing said blending ring and iris, said corneal portion being formed of said transparent thermoplastic material and bonded with said scleral body.

FRITZ W. JARDON.
REUEL W. BENNETT.

REFERENCES CITED

The following references are of record in the file of this patent:

UNITED STATES PATENTS

| Number | Name | Date |
| --- | --- | --- |
| 807,437 | Burt | Dec. 19, 1905 |
| 1,219,058 | Weber | Mar. 13, 1917 |
| 1,881,038 | Whitehouse | Oct. 4, 1932 |
| 1,979,321 | Dunner | Nov. 6, 1934 |
| 1,993,121 | Travers | Mar. 5, 1935 |
| 2,090,837 | Gould | Aug. 24, 1937 |
| 2,394,400 | Noles | Feb. 5, 1946 |
| 2,497,872 | Erpf et al. | Feb. 21, 1950 |

FOREIGN PATENTS

| Number | Country | Date |
| --- | --- | --- |
| 279,785 | Great Britain | Sept. 27, 1928 |

OTHER REFERENCES

Obrig, "Contact Lenses" (Copyright 1942), page 193.